March 30, 1943.   E. E. CISSNA   2,315,316
ASTROLOGICAL CALCULATOR
Filed Feb. 10, 1941
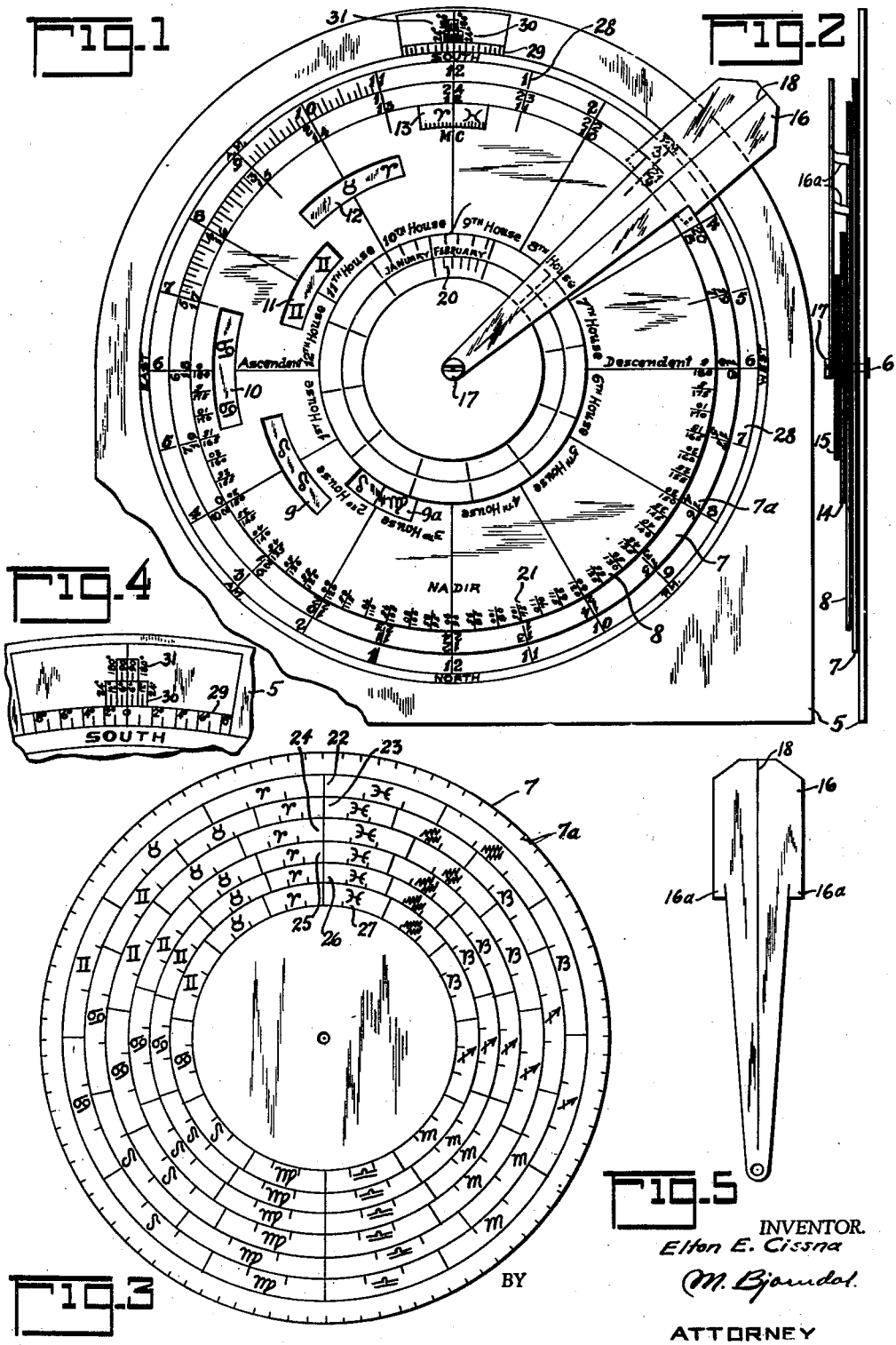
INVENTOR.
Elton E. Cissna
BY
M. Bjorndal
ATTORNEY Patented Mar. 30, 1943

2,315,316

UNITED STATES PATENT OFFICE 2,315,316

ASTROLOGICAL CALCULATOR

Elton Eugene Cissna, Bayonne, N. J.

Application February 10, 1941, Serial No. 378,324

3 Claims. (Cl. 35—44)

This invention relates to improvements in astrological calculators suitable for simplifying the calculations necessary for erecting a horoscope.

An important object of the invention is to provide a simple rotary calculator having a plurality of scales arranged on a plurality of discs rotatable around a central pivot whereby astrological calculations can be quickly and easily made.

A further object of my invention is to provide a simple calculator of low cost which can be operated by anyone with a little instruction and which may take the place of books and tables on the subject.

Other objects and advantages of the invention will be apparent during the course of the following description.

In the accompanying drawing, forming a part of this specification, and in which like numerals are employed to designate like parts throughout the same:

Figure 1 is a plan view of the front face of an astrological calculator embodying my invention, Figure 2 is a side view of same, Figure 3 is a plan view of the front face of the main scale of the calculator, Figure 4 is an enlarged front view of part of the scale of the calculator, and, Figure 5 is a plan view of the rotatable pointer or indicator.

In the drawing, wherein for the purpose of illustration, is shown a preferred embodiment of my invention, the numeral 5 designates the base board of the calculator having the central pivot 6 which is fastened to the base board 5 and upon which is placed first the disc 7 which is circular and rotatable on pivot 6, see Figures 1, 2 and 3. In front of disc 7 is placed a second circular disc 8 which is fixed on the central pivot 6. This disc has a plurality of cut out windows, 9a, 9, 10, 11, 12 and 13 through which the front surface of disc 7 may be seen in different positions.

Another disc 14, which is also circular and rotatable on pivot 6, is placed in front of disc 8. On top of disc 14 is placed a friction washer 15 and the pointer or indicator 16 is finally placed on pivot 6 in front of the discs and held in frictional relation to same by nut 17. An expanded side view of the arrangement of these discs is shown in Figure 2, where the thickness of the various discs has been greatly exaggerated in order to clarify the arrangement. The indicator 16 is made from transparent material such as cellulose acetate and has an indicator line 18 which extends radially from the central post 6 outward.

Beginning from the front, the various scales of the instrument may be described as follows:

Disc 14 has a calendar scale where the twelve months of the year are arranged in clockwise rotation around the outer edge 19 of the disc. This scale is for a normal year and is subdivided into weeks and days, with each month having its proper number of days on the scale. Inside this scale and on the same disc 14 is arranged a similar calendar scale 20 for leap year in which the month of February has a twenty-ninth day. Disc 14 is rotatable on pivot 6. The calendar scale is set once for each reading and is then left stationary.

Disc 8 carries the Greenwich mean time (G. M. T.) scale 21 along the lower half of its periphery. The figures given are both for east and west longitude and are usually shown in black for east longitude while the complementary figures for west longitude are shown in red letters. The face of disc 8 is furthermore divided into a picture of the heavens such as used in astrological calculations, i. e., the circle is divided into twelve equal divisions each called a "house." This division serves to make a chart of the zodiac as it would appear from the birth place of the person whose horoscope is to be erected. The scale shown on the instrument in Figure 1, disc 8, is for the northern hemisphere in which a person will always have to look to the south to see the noon-day sun. South is, therefore, marked "M. C.," which stands for meridian centre or mid heaven, and east will then appear to the left and west to the right. East is called "ascendent" and west is called "descendent" and north is "nadir." The "houses" all comprise thirty degrees each and the first "house" begins at the "ascendent," and the "houses" are arranged in an anti-clockwise rotation.

In back of disc 8 is disc 7 which carries the main scales as shown in Figure 3. Along the outer periphery of this scale is arranged a scale 7a of a twenty-four hour clock for setting of the sidereal time. This scale is divided into twenty-four equal sections, one for each hour of one complete rotation of the earth. Each hour is divided into suitable divisions according to the size of the scale. Inside of the clock dial, the disc 7 carries six scales 22, 23, 24, 25, 26, and 27, one for each of the six "houses" on the "ascendent" side. Due to the well known fact that the signs of the other six "houses" are opposite to those of the first six, it is only necessary to have six scales. Each one of these six scales is divided into twelve divisions, one for each of the signs of the zodiac. The six scales begin at the "M. C." point and run anti-clockwise beginning with the signs Aries, Taurus, Gemini, etc. and ending with Capricorn, Aquarius and Pisces. It will be noted that the sign "Aries," for instance, is always opposite to the sign "Libra," the sign "Taurus" is opposite to the sign "Scorpio," etc. These six scales, as shown on disc 7 in Figure 3, are all worked out for a certain latitude. For different latitudes, charts with different scales will have to be furnished.

In addition to the scales mentioned, the base board 5 carries a fixed clock dial having twenty-four divisions and running from 1 to 12 a. m. and p. m. This scale 28 is placed immediately outside the twenty-four hour clock scale 7a. Outside of the scale 28 are placed the four directions of the compass. At the top of the base board 5 and immediately adjoining scale 28 is a small scale 29 for the purpose of making correction for longitude. This scale is laid out from the center (M. C.) with degrees east and west and by moving the pointer to the number of degrees east or west of standard time longitude, correction of plus or minus four minutes for each degree will automatically be made.

Adjoining scale 29 is another scale 30 where corrections are made to ten seconds for every hour interval after noon hour of the birthday. A similar scale 31 adjoins scale 30 and by using this scale ten seconds corrections will be added for every fifteen degrees longitude if west of Greenwich and subtracted if east of Greenwich. The scales 29, 30 and 31 are shown enlarged in Figure 4.

The operation of my invention is as follows: After finding the sidereal time of the moment of birth in the tables called "ephemeris," the indicator line 18 is set on this time on the sidereal time scale 7a. The indicator and main scale disc 7 are preferably frictionally connected so that when the indicator is moved, disc 7 will move with same except when disc 7 is held down by one hand while the indicator is moved with the other. The next step is to move the indicator with the disc 7 to the birth hour on the fixed clock scale 28. The disc 7 is now held down tightly against the base board and indicator line 18 is brought up to the "M. C." line. To make the correction of plus or minus four minutes for each degree longitude east or west of the standard time zone longitude it is now only necessary to find the longitude of the birth place and to find the difference between this longitude and the nearest standard time zone longitude. The pointer line 18 is now moved up to the number of degrees east or west of the standard time zone longitude on scale 29 while the disc 7 is still held in a fixed position. Next the disc 7 is released and is moved back with the indicator line 18 to the "M. C." line.

It is now necessary to make correction for every hour interval between noon of the birthday and the moment of birth. For this purpose, the indicator line 18 is moved the proper number of degrees on scale 30 while disc 7 is held in a fixed position. Next the disc 7 is clamped to the indicator 18 and both together are moved back to the "M. C." line similarly to what was done when making correction for standard time on scale 29, as described supra. Finally correction is made of ten seconds for every fifteen degrees longitude east or west of Greenwich. If the birth place is west of Greenwich ten seconds are added for every fifteen degrees and subtracted if the birth place is of an east longitude. This correction is made on scale 31 by moving indicator line 18 the proper number of degrees and then moving the indicator with the disc 7 back to the "M. C." line similarly as described supra.

The horoscope may now be erected by reading the signs which appear respectively on scales 22, 23, 24, 25, 26 and 27 in the cut-out observation windows 13, 12, 11, 10, 9 and 9a. In each window will appear the "sign-cusp" of the proper "house" and the number of degrees indicated on the scale as read on the "cusp line," indicates the position of the sign. By placing a transparent horoscope chart over disc 8, it is now possible immediately to write out a horoscope. It is also, of course, equally possible to use an ordinary horoscope chart and copy the signs and degrees from the calculator on to this chart. As mentioned supra, if for instance the sign of the Aries appears at the "cusp" of the 9th house it is immediately known that the sign Libra will appear at the "cusp" of the 3rd house and similarly for the other houses. It is thus possible to read, for instance, 18 degrees Pisces on the "M. C." line, 23 degrees Aries on the 11th house cusp, 3 degrees Gemini on the 12th house cusp, etc. directly from the calculator without any further corrections or elaborate calculations. The erection of a horoscope is thereby greatly facilitated and the time required is cut to a fraction of that ordinarily used.

In addition to the calculations shown above, my calculator may also be used for determining the Greenwich mean time (G. M. T.) on scale 21, and also to eliminate calculations of degrees by moving up the chart to any desired year following birth. This greatly facilitates the erection of subsequent horoscopes and with a calculator of a sufficient size the results obtained are of an accuracy comparable with the best calculated values.

It is to be understood that the form of my invention, herewith shown and described, is to be taken as a preferred example of the same, and that various changes in the shape, size, and arrangement of parts may be resorted to without departing from the spirit of my invention or the scope of the subjoined claims.

Having thus described my invention I claim:

1. An astrological calculator of the character described comprising a base board having a clock scale reading from 1 to 12 on each half of the circumference and indicia constituting a plurality of correctional scales, said correctional scales comprising three separate sets of indicia for making three distinct time "corrections" for east and west longitude and hour interval of birth, substantially as described; a pivot fastened to said base board; a main scale rotatably mounted on said pivot, said main scale being in the form of a circular disc and having a clock dial for sidereal time along its outer periphery, and a plurality of scales for the various signs of the zodiac; a chart disc having a plurality of windows corresponding to said sign scales on the main scale, said chart disc being mounted on said pivot with said main scale between it and the base board; an indicator rotatably mounted on said pivot and frictionally coupled to said main scale whereby said scales and clocks may be used to carry out astrological calculations, and a calendar disc and a frictional washer interposed between said indicator and said chart disc.

2. An astrological calculator of the character described comprising a base board carrying a circular clock scale reading from 1 to 12 on each half of its periphery and indicia constituting a plurality of correctional scales along its periphery, said correctional scales comprising three separate sets of indicia for making time corrections, substantially as described; a main scale comprising a circular disc having a clock scale for sidereal time arranged in anti-clockwise rotation along its outer periphery, said clock scale being corresponding to and adjustable along said fixed clock scale of said base board, said main scale further having a plurality of sign scales calculated in the signs of the zodiac, said main scale being rotatably mounted on said pivot; a chart disc having a plurality of observation windows corresponding with opposite pairs of said zodiacal sign scales on said main scale and being fixedly mounted on said pivot in front of said main scale, said chart disc being divided into twelve "houses"; a calendar disc carrying along its periphery two calendars, one for a normal year and one for leap year, said calendar disc being rotatably mounted in front of said chart disc, and indicating means rotatably mounted on said pivot whereby said scale may be moved into various positions.

3. An astrological calculator of the character described, comprising a base board carrying a circular clock scale having 24 divisions, one for each of the twenty-four hours, and reading from 1 to 12 on one-half of the periphery and similarly on the other half; a correctional scale located at the top center of said clock scale and giving divisions in degrees of east and west longitude whereby longitudinal time corrections can be set; a second correctional scale located above the said scale for longitudinal corrections, and providing divisions calculated to correspond to ten seconds for every hour interval; a third correctional scale located immediately above said second correctional scale and providing divisions calculated to correspond to ten seconds for every fifteen degrees longitude east or west of Greenwich; a main scale comprising a circular disc having a clock scale for sidereal time arranged from one to twenty-four in anti-clockwise rotation along its outer periphery, said sidereal time clock scale being placed immediately inside said clock scale on the base board and being rotatable on a central pivot, said main scale furthermore having a plurality of sign scales calculated in the signs of the zodiac; a chart disc having a plurality of observation windows corresponding with opposite pairs of said zodiacal sign scales on said main scale and being fixedly mounted on said central pivot in front of said main scale, said chart disc being divided into twelve "houses"; a calendar disc carrying along its periphery two calendars, one for a normal year and one for leap year, said calendar disc being rotatably mounted in front of said chart disc and indicating means rotatably mounted on said pivot whereby said scale may be moved into various positions.

ELTON EUGENE CISSNA.